US005748737A

United States Patent [19]
Daggar

[11] Patent Number: 5,748,737
[45] Date of Patent: May 5, 1998

[54] MULTIMEDIA ELECTRONIC WALLET WITH GENERIC CARD

[76] Inventor: Robert N. Daggar, 2214 Springwood Dr., Suite. T4, Reston, Va. 22091-2350

[21] Appl. No.: 339,694

[22] Filed: Nov. 14, 1994

[51] Int. Cl.[6] .............................. H04L 9/00; G06F 17/60
[52] U.S. Cl. ...................... 380/24; 380/23; 380/25; 380/49; 380/50; 235/379; 235/380; 395/239; 395/241
[58] Field of Search ......................... 235/379, 380; 380/4, 9, 23, 24, 25, 49, 50; 395/239, 241

[56] References Cited

U.S. PATENT DOCUMENTS

| | | |
|---|---|---|
| 3,447,139 | 5/1969 | Tickle . |
| 3,582,912 | 6/1971 | Valin et al. . |
| 3,723,983 | 3/1973 | Lienhard . |
| 3,739,357 | 6/1973 | Straubel . |
| 3,774,182 | 11/1973 | Copeland, III . |
| 3,786,449 | 1/1974 | Jauvtis . |
| 3,914,789 | 10/1975 | Coker, Jr. et al. . |
| 4,124,901 | 11/1978 | Battarel . |
| 4,146,174 | 3/1979 | Darjany et al. . |
| 4,199,819 | 4/1980 | Schwee et al. . |
| 4,253,017 | 2/1981 | Whitehead . |
| 4,277,837 | 7/1981 | Stuckert . |
| 4,354,100 | 10/1982 | Rohen . |
| 4,414,554 | 11/1983 | Springer . |
| 4,523,297 | 6/1985 | Ugon et al. . |
| 4,605,844 | 8/1986 | Haggan . |
| 4,614,861 | 9/1986 | Pavlov et al. . |
| 4,700,055 | 10/1987 | Kashkashian, Jr. . |
| 4,701,601 | 10/1987 | Francini et al. . |
| 4,705,211 | 11/1987 | Honda et al. ........................... 235/380 |
| 4,707,594 | 11/1987 | Roth . |
| 4,751,598 | 6/1988 | Hamilton . |
| 4,786,791 | 11/1988 | Hodama . |
| 4,791,283 | 12/1988 | Burkhardt . |
| 4,812,632 | 3/1989 | Kakinuma et al. . |
| 4,849,618 | 7/1989 | Namikawa et al. . |

(List continued on next page.)

OTHER PUBLICATIONS

"Magnetic Heads For Digital Recording" dated 1990 by Ciureanu, pp. 652 through 669.
Brochure entitled "CAFE, The Electronic Wallet For The Information Age" dated 1994.
Article entitled "Micro View, The Road to the Supersmart Card" dated 1989.
Brochure entitled "Mondex, The Worldwide Alternative to Cash" dated 1994.
"Thin Film Devices Applications" by Kasturi Chopra, pp. 192 through 197 (no date shown).
"Magnetic Thin Films and Devices" by B.K. Middelton, pp. 662 through 669 (no date shown).

*Primary Examiner*—Bernarr E. Gregory
*Attorney, Agent, or Firm*—Sixbey, Friedman, Leedom & Ferguson; Eric J. Robinson

[57] ABSTRACT

An electronic wallet is disclosed which provides multiple data media interfaces. Standard interfaces will include a smart card reader/writer, a magnetic reader/writer, a radio frequency transceiver and a user interface. A generic card is insertable into an electronic wallet to provide magnetic or smart card data carrier means. The generic card assumes the identity of any stored digital card and is submitted to a card acceptor in that guise. A generic attachment card is also insertable into an electronic wallet to provide further media interfaces via various card attachments. In another embodiment, the electronic wallet and generic card are combined into a single wallet-card which also requires a wallet-card holder. Almost all the functions provided by a separate electronic wallet, generic card and generic attachment card are included in the electronic wallet-card and wallet-card holder. In operation, media independent digital cards will be stored within an electronic wallet and can receive or output data via any standard or optional media interface. A digital card will be selected and interfaced with a specified or default medium, with digital card content capable of being medium specific. Digital card and medium selection can be specified by either the wallet user or the digital card recipient.

27 Claims, 5 Drawing Sheets

U.S. PATENT DOCUMENTS

| | | | |
|---|---|---|---|
| 4,868,373 | 9/1989 | Opheij et al. | 235/380 |
| 4,868,376 | 9/1989 | Lessin et al. . | |
| 4,870,604 | 9/1989 | Tatsuno | 235/380 X |
| 4,905,186 | 2/1990 | Fukui | 395/239 |
| 5,015,830 | 5/1991 | Masuzawa et al. | 235/380 X |
| 5,063,467 | 11/1991 | Colineau et al. . | |
| 5,120,939 | 6/1992 | Claus et al. . | |
| 5,159,347 | 10/1992 | Osterwalder . | |
| 5,221,838 | 6/1993 | Gutman et al. . | |
| 5,224,162 | 6/1993 | Okamoto et al. . | |
| 5,264,685 | 11/1993 | Eisermann . | |
| 5,272,319 | 12/1993 | Rey | 235/379 |

MULTIMEDIA ELECTRONIC WALLET WITH GENERIC CARD

FIELD OF THE INVENTION

This invention relates to portable communication devices which include a protected processor and storage, multiple standard and optional media interfaces, data encryption/decryption capabilities and a generic multimedia card, such as a multimedia transaction card.

BACKGROUND OF INVENTION

In analyzing the contents of a traditional wallet, the items carried in this hypothetical wallet currently create numerous problems. A typical wallet holds a variety of items such as financial cards (debit cards, credit cards, telephone cards, etc.), miscellaneous cards (drivers license, social security card, access card, transportation or fare cards, health and insurance cards, etc.), cash (notes and coins), check book, various paper receipts (Automated Teller Machine receipts, purchase transactions receipts, etc.), a phone and address book, business and personal name and address cards, a note pad and a calculator. As discussed below, however, there are many shortcomings associated with the provision of each of these items in the typical wallet carried by a consumer.

WALLET ITEMS

1. CARDS

The use of information bearing cards is proliferating, especially in the financial sector. A variety of cards are now used, or intended for use, in making payments, obtaining funds, obtaining access to a physical area or a computer system, and providing card owner identification and information.

With the explosion of card based acceptance, the need to carry multiple cards has become commonplace, with the average household in the United States owning an average of approximately nine payment cards alone. Furthermore, this explosion is being fuelled by current trends.

Within the financial sector a number of electronic cash schemes are in progress. However, since these systems are in competition and even use different media, the need to carry multiple cash cards for different applications is highly probable (e.g. stored value telephone card and electronic purse card). Not only that, a trend towards credit card co-branding has seen the emergence of non-financial institutions as no-fee credit card issuers, with enticements to obtain a card based on core business inducements. With the introduction of electronic cash and the continued growth of on-line debits, this trend is certain to be adopted by asset and cash based institutions, such as mutual funds and electronic cash providers, resulting in even more cards.

In other areas, trends in providing national health cards, and a proposed digital signature card to allow signed electronic tax return filing, are just two of the biggest card issuing systems that will create still more cards.

A major problem of the card explosion is the different types of card media that have emerged. The debit/credit card typically employs a magnetic stripe, while access control is dominated by either magnetic stripe or radio frequency proximity cards. Stored value cards may use a magnetic stripe, while electronic purse systems have primarily adopted the smart card—with contact cards (i.e. cards have electrical contacts disposed therein for transferring information from the card to a card reading mechanism) being used for retail payments and non-contact cards for transportation payments such as road tolls.

A further card problem lies with the need to ensure card data authenticity. This is particularly so in the credit card industry which has experienced an enormous rise in fraud and/or theft during recent years. In 1992 losses on the order of US$ 2 billion resulted from credit card fraud or theft. A wealth of security features have been implemented ranging from inclusion of holograms and tamper proof signature strips to a hash code based on unique card details.

The current fraud prevention trend is towards encryption using a smart card micromodule, which typically includes a combination of microprocessor and non-volatile storage memory. Micromodules are highly secure against unauthorized access and also possess the ability to perform symmetrical and asymmetrical data encryption. However, an installed base of smart card readers does not yet exist in sufficient numbers to allow this micromodule to be taken advantage of. That is, smart card readers capable of interfacing with and receiving data from the micromodule contained in the smart card are not as widely installed as other forms of card interface technology, such as magnetic stripe readers. Therefore, the ability of the consumer to use a card having a smart card micromodule to initiate a consumer transaction is severely restricted.

2. CASH

It has often been argued that elimination of physical cash would solve the majority of crimes, as many crimes are cash based or a direct result of a cash based industry such as illicit drug sales. The sheer handling of cash also causes other significant problems. The cash payer must carry many denominations so as to provide correct monies, especially with the growth in self-service devices. Obtaining cash is also a problem and has only partially been alleviated through the use of Automated Teller Machines (ATMs). ATM users are frequently targets of robbery attempts and ATM interface formats are becoming increasingly proprietary, with use of non-proprietary ATMs incurring a punitive fee.

Cash acceptors incur significant cash handling costs which have been estimated at approximately 2% of their cash value. Acceptors must provide secure cash storage, count and reconcile takings, obtain and hold sufficient denominations to provide correct change, and install robbery and theft prevention measures.

Counterfeits are also a problem, with the ability to create virtually unidentifiable counterfeits already a reality. Lastly, cash creation and replacement is extremely expensive, especially in note based countries.

3. CHECKS

Checks cause similar handling problems to cash in that there are significant costs incurred in check processing. Checks must be physically transferred to the check settlement institution, usually delivered to the check account holder, and check images must legally be retained for a lengthy period after settlement has occurred.

The cost of transporting checks, coupled with the technological limits of handling current volumes, and the regulatory and customer demands for faster check settlement, make checks an inefficient, risky and costly payment instrument.

From a check issuer perspective the time involved in actually writing a check, recording it, and performing checkbook reconciliation are significant. Not only that, check acceptance is, at best, regional and even then will typically require at least one form of identification such as a check cashing card or drivers license.

Finally, check fraud is exploding. With the advent of color printers and scanners, and with the introduction of sophisticated desktop publishing software, the ability to reproduce or create a seemingly authentic check is within the capability of millions or people. Even such secure instruments as cashiers checks have been successfully counterfeited, with recent fraud and bounced check levels estimated at between $US 3–6 billion per annum.

PAYMENT RELATED PROBLEMS

A number of general payment problems are also related to the wallet items discussed above. Credit payment authentication is primarily performed by establishing direct communication link with the card issuer, resulting in communications costs and an inherent and variable transaction approval delay. Alternatively, authentication can be limited to card security feature checking, albeit with significantly greater fraud risk. These factors have resulted in either non-acceptance of credit cards, or non-cost effectiveness for small amounts and frustrating approval delays for time critical transactions. Furthermore, in the majority of countries, communication systems can be too costly, too slow or altogether non-existent.

A further problem is associated with remote or self-service device payments. These are currently mainly limited to credit cards, with increased card owner and card acceptor risk as neither is able to fully vet the other. The result has been a number of payee and payer frauds, particularly in the area of telephone transactions. The arrival of interactive television and burgeoning self service vending device growth are creating even more risk exposure problems. Because of these problems, non face-to-face card acceptance qualification has been made much more difficult, thereby eliminating a large number of businesses from offering this type of service.

Offline debit cards have recently been offered as check replacements, but carry the same card authentication problems as credit cards. They also carry the risk of a bounced debit transaction due to the unavailability of funds.

Finally, point-of-sale debit card use has been pushed as an alternative to cash. However, an on-line card issuer system is required as well as a numeric keypad to allow the customer to enter a secret PIN. Furthermore, most systems are regionalized and semi-proprietary thereby limiting their effectiveness. Lastly, the cost of implementing this type of system is significant and has discouraged large numbers of businesses from doing so.

Other wallet items provide individual problems which will become apparent, with the major problem being one of wallet clutter.

PRIOR ART

U.S. Pat. Nos. 4,614,861 to Pavlov et al. and 4,707,594 to Roth appear to disclose electronic wallets in the form of self contained cards including a power supply, user interface, processor and static magnetic stripe. Roth's patent is very much related to wallet design, with media interfaces limited to a keypad and display. Pavlov also provides keypad input and display output and relates primarily to data security. Additionally, an electronic input/output port is also provided.

A number of patents and documents discuss electronic wallets that provide a processor, memory, a user interface, a power supply and a card processor reader/writer. However, none of these references disclose a card having a magnetic reader/writer or generic multimedia card, with only two including wireless data transfer. Omission of the magnetic reader/writer precludes the ability to utilize the existing magnetic stripe infrastructure.

U.S. Pat. Nos. 4,277,837 to Stuckert and 4,523,297 to Ugon et al. are examples of these type of electronic wallets. Ugon demonstrates the viability of communication between an electronic wallet and a card micromodule via a smart card reader/writer and also includes an electronic wallet card insertion slot. Stuckert discusses a card processor interface and a radio frequency transmitter.

A further example is provided by Mondex. An electronic purse card is outlined in a document titled "MONDEX— The Worldwide Alternative to Cash." Electronic monies are carried on a smart card, and an optional handheld wallet that includes a display, keypad and smart card interface is also provided.

A more common electronic wallet of the aforementioned variety is envisioned by CAFE and outlined in a document titled "CAFE, the Electronic Wallet of the Information Age." This also provides a display, keypad, smart card interface and an infrared medium interface.

A variety of self contained magnetic stripe emulators have been discussed, with the primary aim being to allow multiple magnetic stripe cards to be encapsulated on one physical smart card. All these emulators include a processor, memory and power supply. Some also include a keypad and display, but none include a magnetic reader/writer, radio frequency transceiver or smart card reader/writer.

U.S. Pat. Nos. 4,701,601 to Francini et al., 4,868,376 to Lessin et al. and 4,814,591 to Nara et al. are all examples of electronic wallets with a magnetic medium emulator and user interface, while U.S. Pat. Nos. 4,791,283 to Burkhardt and 4,786,791 to Hodama are examples of magnetic stripe emulator cards. A variety of different magnetic stripe emulation methods are disclosed, with certain shortcomings being common to all.

First, emulation will require an active power supply. However, power is effectively limited to an internal battery as other power sources would preclude card use in magnetic readers where a card is completely inserted (most ATMs currently fit into this category). In this type of reader solar cells would be deprived of light, while no external power supply could conveniently be attached once a card is fully inserted. Failure to use an internal battery would necessitate the carrying of multiple cards thereby negating the need for emulation.

Problems associated with an internal battery are significant. Battery life will be limited because of the physical dimensions of the card, which also makes inclusion of a replaceable battery extremely difficult. As a consequence, card costs cannot be amortized over the card life and are effectively limited to the life of the battery. Conversely, magnetic encoding can be done prior to card submission which circumvents any power and size constraint problems.

Second, emulation requires the inclusion of complex circuitry in a device of card dimensions. Such a card must meet certain flexing standards which increases the likelihood of circuitry breakage and is exacerbated by the habit of carrying a card under adverse conditions, such as in a purse or pocket.

Third, emulation will typically require the emulator to be aligned with the read head, kept stationary during emulation, and include an emulation activator. Since most emulators are depicted as being physically shorter than the length of a magnetic track, the emulator will be aligned with the read head for a shorter duration. This could result in incorrect data decoding, especially in swipe readers where the swipe speed varies significantly. Therefore, to ensure correct data transfer, different handling methods for emulator and non-emulator based cards is necessitated when using swipe readers.

Fourth, emulator activation within a sealed reader such as certain ATMs must be provided. Hodama appears to have recognized this and has included an emulation activator so that emulation is started as the emulator becomes aligned with the read head. However, Hodama does not address the problem of stationary card emulation in swipe readers.

Finally, no ability to read magnetic stripe cards is provided, although Lessin also includes ability to accept data from a magnetic writer. This precludes reading of magnetic data on a separate card, which prevents a wallet from storing existing magnetic card data or reading magnetically encoded digital card transactions.

U.S. Pat. No. 4,791,283 to Burkhardt appears to have recognized the need for card handling uniformity and addresses the problem of placing emulators stationary in a swipe magnetic reader by duplicating emulated data values across substantially the entire length of where a magnetic medium would reside. This solves the problem of having to place the emulator stationery against a magnetic read head and also allows insert reader usage as the emulation rate can be matched with the known card insert speed. However, it raises a different problem in swipe readers as the card swipe speed is sufficiently variable to exceed tolerances for accurate data decoding using a single emulation rate. To overcome this deficiency, Burkhardt proposes to modify all magnetic readers so that a card could monitor its speed past the read head and adjust its emulation rate accordingly. This modification would be an enormous and costly task to implement given the numbers of magnetic readers that exist. Furthermore, failure to modify any significant number of swipe readers renders them unusable by emulator based cards, thus requiring the stationary method of operation.

One solution to the problems discussed above would be an emulator and a sensor, at least as long as a magnetic track, which would act as an emulation activator and positioner. This sensor would continuously detect the magnetic reader head position and adjust the emulation rate accordingly. However, power and flexing problems would still need to be overcome. Moreover, card costs would be high because of the difficulty in manufacturing such a card with inherent size constraints, and the wallet could still not function as a smart card or magnetic stripe reader/writer.

Two patents relating to an electronic wallet with magnetic reader/writers are disclosed. U.S. Pat. No. 4,812,632 to Kakinuma et al. appears to disclose an electronic wallet having a processor, user interface and mechanized magnetic reader/writer. Kakinuma et al. appears to be intended purely as an electronic check generator. No mention is made of using a secure processor and memory, or of encrypting check information, with the intention appearing to be the avoidance of carrying a check book and elimination of paper check handling. Automatic check recording and electronic check submission are also provided, thereby allowing faster and cheaper check transfers and settlement. However, no smart card reader/writer or radio frequency transceiver are included.

U.S. Pat. No. 5,221,838 to Gutman et al. also includes an electronic wallet with processor and storage, user interface, magnetic reader/writer and radio frequency communications capability. This wallet is primarily a radio communication and direct wire connect device, with the magnetic reader/writer and universal card included purely for electronic card holding. No mention is made of encrypting card data to reduce fraud, or of using the electronic wallet to generate new or off-line payment instruments. Gutman's aim in providing the universal card is purely to avoid the need to carry multiple cards, with card data essentially being reproduced on the universal card and submitted in accordance with current practice.

Gutman also includes selective wireless call receiving means as a major component and envisages transactions primarily occurring in real-time via selective radio frequency data. This approach is not considered necessary to achieve efficient, cost-effective and timely payment authentication. Creation of such a system will require significant infrastructure development and cost, with costs being recouped by fees charged for these services. Furthermore, the ability to use these services will not be available at every location for some considerable time. Also, submission of transactions of a small amount would not appear to be economically viable.

Gutman and Kakinuma have also failed to recognize the emerging smart card infrastructure. No smart card reader/writer or generic smart card have been included, nor has a smart card micromodule as the security engine been disclosed, with Gutman's encoder and decoder appearing to be used purely for securing radio frequency data and not for encrypting any universal card data.

Gutman's wallet does not appear to have been designed as a ubiquitous wallet that will be easily carried at all times, by virtually everyone, and usable everywhere. Furthermore, with the inclusion of a printer and bar-code reader, wallet cost and size will be raised significantly.

The major wallet omission is the exclusion of a smart card reader/writer which significantly limits the effectiveness of both Gutman's and Kakinuma's wallets in the following areas.

First, no smart card/wallet data exchange can occur. This prevents inclusion of digital cards, such as electronic purses, that are primarily used by the emerging smart card infrastructure. It would appear that a smart card could be used as the universal card, but this would limit the number of digital cards to the storage capacity of the smart card, with no way of easily expanding that capacity. Furthermore, such digital cards would effectively be locked into the smart card infrastructure and would not be media independent.

Second, mutual card/wallet authentication cannot be established. This prevents these wallets from accepting smart card digital card transactions (i.e. functioning as a smart card point-of-sale terminal), transferring monies to or from a smart card electronic purse, or including discrete digital card transaction security measures from both a universal card and a wallet.

Third, universal card data input and output control cannot be performed. With the ability to immediately read and write magnetic stripe data, fraud potential is increased rather than being reduced. Data from a stolen credit card could be instantly transferred to another card, fake or genuine, and used immediately. Genuine cards could be used in establishments where the sales draft is computer generated using magnetic stripe data, whereas a fake card could be used where a card imprint is taken. In both cases, a genuine signature, hologram etc. could be used on the card to defraud the payee.

This problem also limits a card's ability to function as a truly universal card. Such a card could have a photo and other information printed on it, thereby allowing any card issuer to create a digital card which is based on that information (e.g. drivers license, passport etc). However, card issuers must be assured that physical and digital card data correspond before they will adopt this approach. Such information could be included on the same smart card, but with the same aforementioned storage and smart card media dependence constraints.

To provide a truly universal card with media independent digital cards, no digital card should permanently reside on this card. Instead digital cards should be downloaded to a generic multimedia card from a wallet, or from a digital card storage medium which can be read from and written to by a wallet.

The ability to establish both card authenticity and digital card identity must also be provided. Card authenticity is needed to be assured that data received from a universal card (such as monies from an electronic purse) is genuine. Similarly, permission for a universal card to assume a digital card identity must also be determinable to prevent indiscriminate digital card reproduction.

A final requirement is the prevention of card substitution after universal card authentication and digital card identification have been established. This is needed to ensure that the universal card given approval to assume a digital card identity must be the same card that this information is actually downloaded to. Conversely, information retrieved from a downloaded digital card must be returned from the same physical card it was output to, so as to prevent multiple transaction resubmissions to the same wallet or to multiple different wallets. None of the above problems and requirements have been addressed or provided by the prior art and specifically either Kakinuma or Gutman.

SUMMARY OF THE INVENTION

It is an object of the present invention to overcome the aforementioned problems by providing a compact, low cost electronic wallet and generic multimedia card that is capable of holding multiple digital cards.

It is yet another object of the present invention to provide an electronic wallet and generic multimedia card that is easily carried at all times, can be carried by almost everyone, and is usable everywhere.

It is a still further object of the present invention to provide four core input and output methods and media, namely (1) non-interactive contact via magnetized media; (2) interactive contact via a smart card micromodule; (3) non-interactive non-contact via user interface media; and (4) interactive non-contact via a radio frequency transceiver, and to further provide media attachment expandability so that any other media interfaces can be used.

Yet another object of the present invention is to provide an electronic wallet having an "open media" capability such that different media can co-exist within a single application.

A still further object of the present invention is to provide digital cards that can include wallet owner payment cards, identification cards, information carrying cards, digital signature cards or other miscellaneous cards.

It is yet another object of the present invention to provide a digital card processing language that offers easy digital card creation, medium specific digital card content and dynamic digital card process and transaction format alteration.

A still further object is to provide digital card media independence by allowing digital card transaction exchange via any provided wallet media interface.

Yet another object of the present invention is to provide integrity between a generic multimedia card and digital card data to ensure that the generic multimedia card and digital card data correspond.

It is an object of the present invention to allow existing infrastructures to accept existing or new digital card transactions without having to modify that infrastructure or alter the manner in which existing digital cards are handled.

It is a further object of the present invention to provide digital card storage, processing and transaction autonomy so that transactions from the same electronic wallet but different digital cards cannot be matched.

A still further object of the present invention is to allow any electronic wallet to act as a digital card acceptance terminal, and to authenticate and optionally store any digital card transaction, thereby allowing an electronic wallet to also function as a point-of-sale terminal.

Another object of the present invention is to eliminate paper based information by automatic or manual digital card transaction recording and by providing optional additional electronic storage.

It is an object of the present invention to reduce fraud and theft by securing access to an electronic wallet, by protecting the information stored on the electronic wallet, by protecting the digital card transaction creation process, and by allowing input and output digital card data to be encrypted.

A still further object of the present invention is to allow off-line digital card transaction authentication with optional on-line authentication on a random, medium specific or periodic basis.

Another object of the present invention is to allow digital card transactions to be performed using any telephone along with an electronic wallet user interface (e.g. obtain cash, renew digital card, make any type of cash/check/debit/credit payment etc.).

In accordance with these and many other objects, the subject invention includes an electronic wallet and generic multimedia card which allows virtually all traditional wallet items to be recreated in the form of electronically stored digital cards. Multiple standard and optional media interfaces are provided, with a digital card being media independent and capable of transaction input or output via any provided media interface.

The electronic wallet includes protected processor means for controlling the various media interfaces and for executing digital card processes, protected storage means connected to the processor means for storing digital card processes and data, user interface means for digital card selection, medium selection and data capture, power supply means for providing power to the electronic wallet and generic multimedia card circuitry, radio frequency communication means for providing wireless data transfer, magnetic reader/writer means to allow information to be read from and written to a magnetizable medium, and smart card reader/writer means to provide smart card data exchange. The electronic wallet of the present invention provides digital card/generic multimedia card integrity, smart card authentication, card sensing, and further media interfaces via a generic attachment card and various media interface attachments.

The generic multimedia card of the present invention includes protected processor means for executing digital card processes, protected storage means connected to the processor means for storing digital card processes and data, data input-output means to provide authentication of the electronic wallet and for data transfer, and magnetizable medium means for storing magnetically recorded data.

9

In another embodiment, the electronic wallet and the generic multimedia card are combined to form an electronic wallet-card which is supported by an electronic wallet-card holder.

The electronic wallet of the present invention places emphasis on data security as opposed to media security. Also, by using the electronic wallet and the generic multimedia card, all problems associated with card dimensions are circumvented. The electronic wallet therefore provides multiple media interfaces with optional media expendability, digital card process flexibility, and can function as a customer wallet, a smart card and magnetic stripe card acceptance terminal, a data capture device, a remote banking terminal, a remote payment device, an electronic checkbook, an electronic purse, an electronic card holder, a transaction security controller, and a transaction recorder and reconciler, among other functions.

In providing media independent digital cards that can be interfaced with a variety of media, major infrastructure benefits are realized. Infrastructure obsolescence is avoided, of particular importance in the omnipresent magnetic stripe infrastructure, while new and more effective data transfer media interfaces such as, for example, smart card and radio frequency interfaces can be installed. This allows multiple media types to now be able to co-exist within a single application.

Finally, off-line authentication is possible using the electronic wallet of the present invention, thereby providing a very secure, cost-effective and timely method of data acceptance.

DESCRIPTION OF THE PREFERRED EMBODIMENT

Figure 2A:
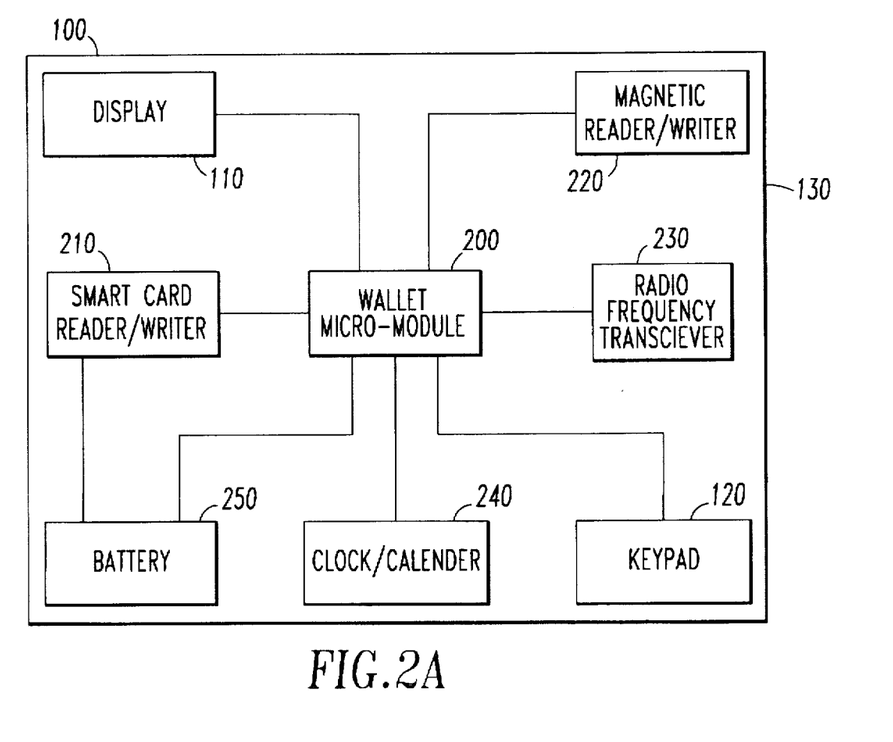
FIGS. 2A and 2B are block diagrams of the electronic wallet and generic multimedia card in accordance with the present invention.
Figure 2B:
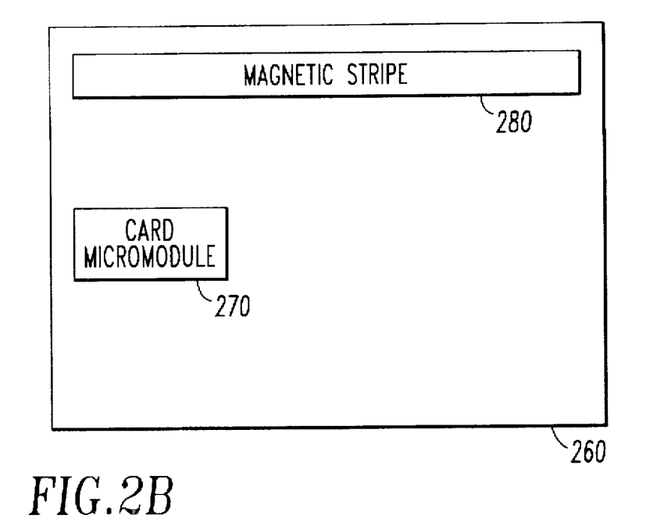

Satisfying customer needs for convenience, security and simplicity, payee needs for faster, safer, more cost-effective operations, and payment funds manager needs for fraud reduction and maximization of existing infrastructure investment through introduction of new instruments, are accomplished by the introduction of the electronic wallet 100 and generic multimedia card 260 (such as, for example, a multimedia transaction card) of the subject invention shown in FIGS. 2A and 2B.

The electronic wallet 100 and generic multimedia card 260 of the present invention provide for the securing of the data as opposed to the media and, the ability to perform data exchange via a variety of media interfaces. This allows different media to co-exist within a single application, with digital cards being media independent and with digital card content being determined by the medium interface used.

A core of four media input and output interfaces are provided, these being (1) a magnetic reader/writer 220 used to permit interfacing with the existing magnetic reader/writer infrastructure; (2) a smart card reader/writer 210 used to permit interfacing with the emerging smart card infrastructure; (3) a wireless radio frequency transceiver 230 used to allow quick and convenient data exchange, and (4) user interface media 110/120 used to act as backup for the other media and to provide data input/output means. Further media interfaces may optionally be attached via a generic attachment card 500 or a serial port (not shown).

Data input and output are preferably in the form of transactions from a temporary or permanent digital card. Digital card issuers can define digital card handling processes and make digital card transactions media specific, media restricted and transaction unique. For uniformity purposes, any portable data carrier is referred to as a card.

Figure 1:
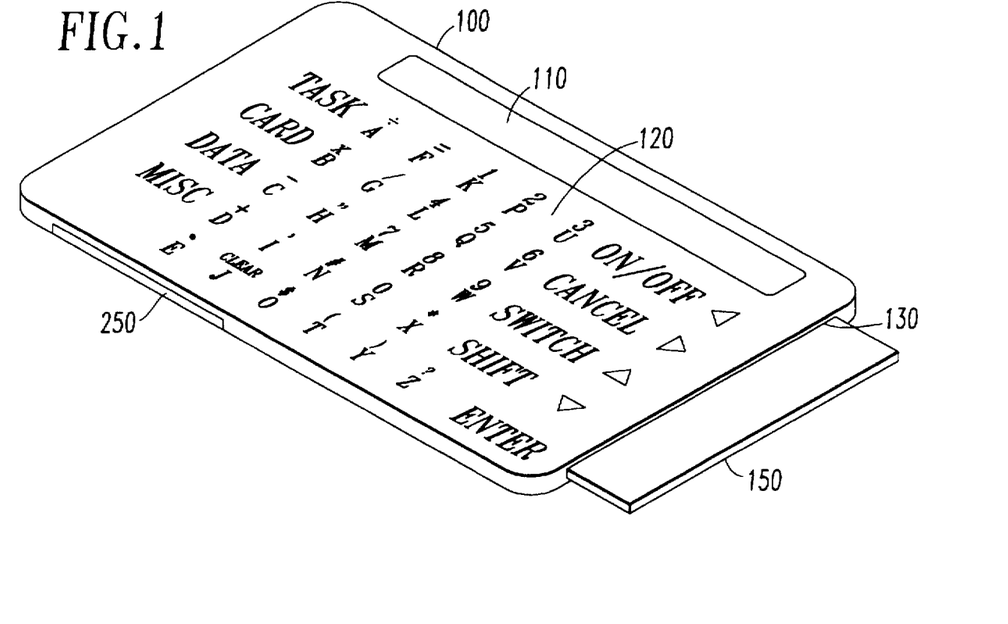
FIG. 1 is a perspective view of an electronic wallet in accordance with a first embodiment of the present invention.

Referring to FIG. 1 a perspective view of electronic wallet 100 is shown in accordance with an embodiment of the subject invention. Such an electronic wallet 100 includes data processing means, data storage means, and media interface means. Preferably, electronic wallet 100 is formed from plastic, metal or other suitable material, and may for example have dimensions approximately 63 mm by 92.5 mm by 4 mm.

A keypad 120 and display 110 provide user interface means. Similarly a card slot 130 provided in the wallet 100 allows any card 150 to be inserted into the electronic wallet 100 so that data exchange via a card medium/wallet medium interface can occur. A variety of card dimensions can be supported, however a typical card will comply with ISO document 7810.

FIG. 2A outlines the components used to allow the electronic wallet 100 to provide data processing means, data storage means and media interface means. A wallet micromodule 200 provides protected data processing and data storage means, as well as controlling other electronic wallet components. Micromodules are used in so called smart cards, with a variety of memory and microprocessor based micromodules already in existence. One definition of a micromodule is "a microprocessor with connected non volatile memory, which includes special physical, logical and chemical measures to prevent unauthorized data access and processor instruction reverse engineering." In the most preferred embodiment of the present invention, a public key cryptography co-processor micromodule is favored so as to provide a digital signature capability. The cryptography co-processor and its microprocessor interface are also protected, and provide asymmetrical encryption/decryption capabilities. An example of such a micromodule is SLE44C200 manufactured by Siemens and commercially available from a number of electronic component suppliers.

By using a micromodule, the best of both worlds can be realized. The smart card has long been hailed as the answer to a variety of needs, when in fact it is the micromodule itself that provides these solutions with the card being purely a convenient micromodule carrier. Protection of data, especially cryptographic keys and processor instructions, combined with the ability to perform symmetrical and asymmetrical encryption, make the wallet micromodule 200 an ideal security engine.

While the wallet micromodule 200 is shown as also controlling the various wallet components, it is possible and within the scope of the present invention that a different microprocessor (not shown) could perform these functions with the role of the wallet micromodule 200 limited to confidential data storage and processing protection. The wallet micromodule 200 and the card micromodule 270 functions could also be combined, with the single micromodule residing on either the electronic wallet 100 or the generic multimedia card 260.

With the inclusion of the wallet micromodule 200, the many benefits of smart cards can be realized, but with a much wider usage. Digital card data can first be secured, then input or output using any of the provided media interfaces.

User interface means are exemplified by a keypad 120 and display 110, although more elaborate means such as touch based or voice recognition interfaces could equally be provided. These media are used in a variety of ways, with one of the most advantageous being the ability to use any telephone as an ATM.

A magnetic reader/writer 220 is provided to allow data exchange via a magnetically encodable medium located on a separate card. Any combined magnetic reader/writer 220, or separate reader and writer, of any type could be used, with magnetically encoded information complying with known standards, encoding techniques (e.g. ISO document 7811) and data storage densities. A large number of thin film magnetic heads and head arrays have been documented as shown in U.S. Pat. No. 4,751,598 to Hamilton, U.S. Pat. No. 5,063,467 to Colineau et al. and in a book titled "Magnetic Heads for Digital Recording" by Petru Ciureanu, the contents of which are incorporated herein by reference.

Typically, a magnetic data card is inserted into the electronic wallet 100 via the card slot 130, with reading and/or writing of data occurring during card insertion, extraction, or while the card is stationary within the card slot 130. A magnetic data card is typically a financial card with one or more magnetic stripes 280, although a card could also be partially or entirely coated with a magnetizable medium to provide a generic magnetic track location capability. While the card slot 130 will mainly house a generic multimedia card 260, any transaction card can be read or written to, with a transaction card classified as any insertable data carrier which contains a magnetizable medium.

By providing magnetic data reading and writing capabilities, the ability to retain the existing magnetic based infrastructure, make existing payments instruments more secure (e.g. credit cards) and provide new payment instruments that can be accepted by this infrastructure (e.g. electronic cash and checks) is provided.

Whereas the magnetic reader/writer 220 is a non-interactive medium, the smart card reader/writer 210 is an interactive medium to a micromodule on a separate card for example a generic multimedia card 260. The smart card reader/writer 210 will typically conform with ISO documents 7816 and/or 10536 related to micromodule placement and electrical contact dimensions, with a contact interface being preferred. However, a non-contact interface could also be used.

The smart card reader/writer 210 serves a number or purposes. First, the smart card reader/writer 210 allows the electronic wallet 100 to store smart card applications in the form of digital cards. The smart card is an emerging and low cost technology, especially in the electronic cash area, and inclusion of this interface allows a digital card or digital card transaction to be downloaded to a generic multimedia card micromodule 270.

Second, the smart card reader/writer 210 allows any smart card to be read or written to. Effectively this allows an electronic wallet 100 to act as a smart card authentication terminal thereby allowing the wallet to function as a point-of-sale terminal, portable data capture terminal or electronic purse supplier/acceptor.

Third, mutual smart card/electronic wallet 100 authentication can be achieved. This is a vital first step in a number of applications, with one use being cash payment mutual authentication before either will release payment information. Separate security features may also be provided by incorporating information from both an electronic wallet 100 and a smart card.

Finally, use of a generic multimedia card 260, and a generic multimedia card 260 medium, can be controlled via the smart card reader/writer 210. There are two types of digital card identities. A totally generic digital card can be output to any media or, optionally, to specific media only (e.g. prepaid card to any medium). However, a card dependent digital card can only be output to a specific generic multimedia card 260 and, optionally, a generic multimedia card 260 medium (e.g. drivers license output to magnetic stripe 280 only).

The final medium interface is a radio frequency transceiver 230 which typically operates at very short ranges and for frequencies preferably in the low frequency range. The radio frequency transceiver 230 provides extremely fast interactive communication between an electronic wallet 100 and an radio frequency communications device or another electronic wallet 100. This allows tasks such as cash payments to be performed automatically, with the wallet owner only required to optionally approve the amount and/or enter a password.

The concept of securing the data and using the medium purely for data transfer equally applies for radio frequencies. Therefore, only a single frequency for send and for receive are needed. However, a spread spectrum approach could be used as a further level of security.

A number of miniature radio frequency transceivers 230 and transponders exist, with the IN-CHARGE card by RACOM demonstrating a very small format radio frequency transponder suitable for use in the present invention. Also, the trend by retail outlets towards radio frequency tags for product and pricing information provides the market to drive radio frequency component costs down, as well as providing a radio frequency data capture infrastructure. Finally, U.S. Pat. No. 5,159,347 to Osterwalder, incorporated herein by reference, demonstrates one embodiment of a very small and effective antenna that could be employed with the radio transceiver of the present invention.

The clock/calendar 240 is included to provide data security, digital card control and user functionality. Date and time can be included to help uniquely identify a digital card transaction, while digital card usage can be protected by checking an expiration date. Lastly, user functions such as date and time based lists and/or events etc. can be manually or automatically recorded.

Power is supplied by a replaceable battery 250, with power supplied to the wallet micromodule 200, and to external cards or attachments via the smart card reader/writer 210. Solar cells or other power supply means could also be used to augment or replace the battery 250.

FIG. 2B refers to a block diagram of a generic multimedia card 260. The generic multimedia card 260 has no fixed identity and can assume the identity of any digital card and then function as either a smart card and/or magnetic data card. Typically the generic multimedia card 260 is of dimensions in compliance with ISO document 7810. However, multiple generic multimedia cards 260 of different dimensions may be used such as a thinner more flexible card typically used in public transportation.

A card micromodule 270 allows the generic multimedia card 260 to communicate with the electronic wallet 100 or any other smart card reader/writer and performs functions similar to a wallet micromodule 200. The card micromodule 270 enables the generic multimedia card 260 to act as a pseudo electronic wallet 100 for one or more digital cards—albeit that no user interface exists. Multiple digital cards or digital card transactions can be downloaded to the generic multimedia card 260 which can then be carried and used without further electronic wallet 100 interaction. Alternatively, an electronic purse card can be used where an electronic wallet 100 is not needed, with cash being downloaded to this purse. An example of possible usage being where a child carries a purse to pay for lunches, etc.

The card micromodule 270 also provides digital card/generic multimedia card 260 security. Digital card identifiers can be stored on the generic multimedia card 260 or a multimedia card 260 identifier can be stored with a digital card, and limits a generic multimedia card's 260 ability to adopt a digital card identity. Should owner information (e.g. a photo) be included on a generic multimedia card 260, the digital card issuer may wish to ensure that digital card data is always tied to that specific card. Therefore, as well as storing a digital card on the electronic wallet 100, a digital card identifier can be stored on a generic multimedia card 260. The digital card process then ensures that this identifier exists on the presented generic multimedia card 260 before any digital card data is output to that card. The card micromodule 270 further assists in this operation by preventing card substitution once it has been established that a generic multimedia card is permitted to assume a digital card identity. Periodic generic multimedia card 260 identity checking is performed until digital card information has been, or is about to be, output to that card.

Other security functions are also provided. A card micromodule 270 is able to prove its own authenticity, as well as establish that of any electronic wallet 100, with additional digital card transaction security also possible by including separate electronic wallet 100 and generic multimedia card 260 security measures.

The generic multimedia card 260 magnetic stripe 280 allows data to be written to it and read from it—primarily by the electronic wallet 100 magnetic reader/writer 220, with data optionally spread over multiple magnetic tracks. Once the magnetic stripe 280 is encoded, the generic multimedia card 260 can be submitted to any magnetic stripe 280 reader/writer in the same manner as if it were the original card. Information can also be read back from an altered magnetic stripe 280 by electronic wallet 100 and financial records of the wallet may optionally be updated automatically.

Other physical information such as a card owner signature, photo, hologram and bar code could also be included on the generic multimedia card 260 so that it becomes owner specific. Furthermore, card types for which a card owner typically only has one can also be included on the generic multimedia card 260. These include Weigand, Barium ferrite and Proximity media, although a proximity card capability could also be provided by the radio frequency transceiver 230 in the electronic wallet 100, or by a separate radio frequency transceiver attachment.

Figure 3A:
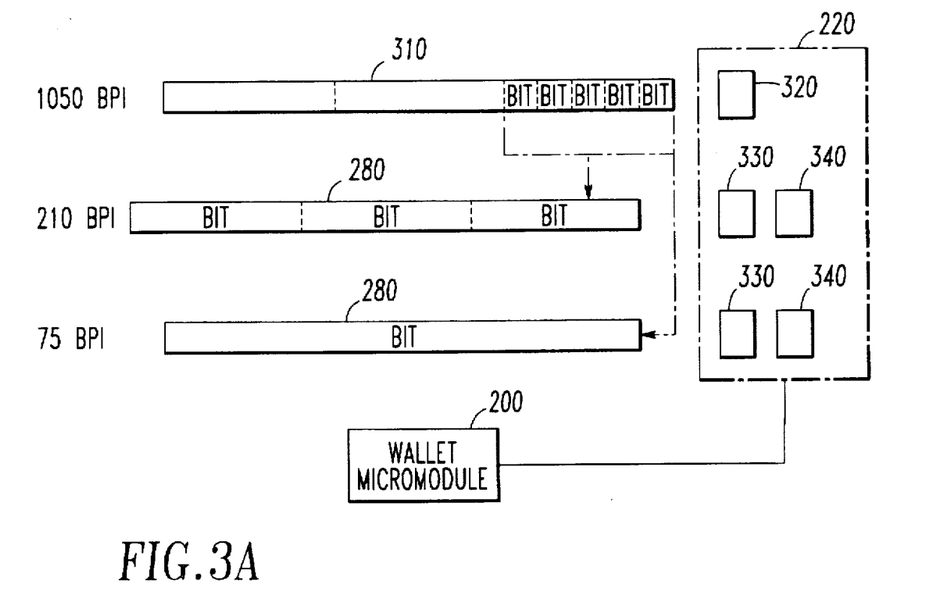
FIG. 3A is a block diagram of the present invention showing the components used to perform manual reading and encoding of a magnetic medium located on a separate card.

FIG. 3A is a block diagram illustrating the most preferred embodiment of a magnetic reader/writer 220 suitable for use in the present invention. The components used to perform manual reading and encoding of a magnetic medium located on a separate card are illustrated.

Reading or writing of magnetic data is achieved by a magnetic reader/writer 220 which includes three magnetic transducers: a magnetic position transducer 320 (MPT), a magnetic write transducer 330 (MWT) and a magnetic read transducer 340 (MRT). Encoding and reading is typically be achieved by manually removing a card from, or inserting a card to, an electronic wallet 100 via the card slot 130.

To ensure that magnetic data is read or encoded correctly, the ability to determine the magnetic medium position is required. This task is performed by the MPT 320 which acts as a sensor and reports all magnetic flux changes to the wallet micromodule 200. A thin film magnetoresistive head is used along with a predefined magnetic positioning clock 310 (MPC) included on the card.

The MPC 310 is a high coercivity magnetic medium with data bits recorded with alternating polarity and changing at each conceivable magnetic medium flux transition. Decoding or encoding is based on the number of MPC 310 bits in relation to a magnetic medium bit, with these tasks performed by the wallet micromodule 200. A permanent MPC 310 is included on any generic multimedia card 260, while an MPC 310 attachment can be placed on any other card. The major benefits of using an MPC 310 is to allow magnetic data to be read from or written to a generic multimedia independent of card insertion or removal speed while still providing the ability to keep the electronic wallet small, low cost, and reliable, with reliability achieved by the elimination of a mechanized card movement device. The MPC 310 can be separate to or combined with the magnetic medium used to encode digital card information.

To accurately determine the correct magnetic medium position the user is required to insert or withdraw a card without reversing direction. Alternatively, specific MPC 310 values could be stored vertically or horizontally (e.g. position 145) which would allow a card to be started, stopped and even reversed. A further less preferred option would be to use the encoded magnetic track data as a positioning clock. However, if the data on this track is corrupted, the ability to accurately encode any track would be lost.

A wide variety of sensing methods could have been adopted including but not limited to: voltage difference measurements, optical sensors, air pressure sensors, hall effect devices, etc. The decision to use a magnetoresistive head is based on the fact that the method is velocity independent, reliable, low cost and could be combined with MWT 330 and MRT 340 manufacture.

A wide variety of magnetoresistive heads have been designed with examples outlined in a texts "Magnetic Heads for Digital Recording" produced by Petru Ciureanu; "Magnetic Recording Handbook. Technology and Applications" by C. Denis Mee and Eric D. Daniel; "Thin Film Device Applications" by Kasturi Chopra; and "Magnetic Thin Films and Devices" by B. S. Middleton. Other magnetic transducers such as hall effect devices or thin film inductive heads could also be used.

The MWT 330 encodes data delivered by the wallet micromodule 200, with the preferred embodiment being a thin film inductive head. The MPC 310 may be placed slightly ahead of the magnetic track, or the MPT 320 may be placed slightly ahead of the MWT 330, with this being required if a significant delay occurs between the time the magnetic medium position is reported and when the appropriate data value is ready to be encoded. A variety of MWTs 330 are possible including, but not limited to, an electromagnetic coil or one or more electromagnetic conductors.

A number of thin film inductive heads have been designed and could be incorporated. Examples include, but are not limited to, U.S. Pat. No. 4,751,598 by Hamilton; "Magnetic Recording Handbook. Technology and Applications" by C. Denis Mee and Eric D. Daniel; and "Magnetic Heads for Digital Recording" by Petru Ciureanu, the contents of which are incorporated herein by reference.

A major benefit of making the magnetic medium on the multimedia card dynamic and regularly altered, it that a very low coercivity magnetic medium can now be used. This significantly reduces the MWT power requirements with all the attendant benefits that this provides.

The final transducer is a magnetic read transducer 340 (MRT) which is used to check the magnetic medium data for correctness during encoding, read existing magnetic medium data on any insertable card, or read back encoded magnetic medium data that might have been modified. The MPC 310 may also be read in conjunction with the MRT 340 so that magnetic medium data can be correctly determined.

The preferred MRT 340 embodiment is a magnetoresistive head, preferably identical to the MPT 320, with all MPT 320 alternatives equally applying. Furthermore the MRT 340 and the MWT 330 could also be combined into a single transducer as shown by Petru Ciureanu in "Magnetic Heads for Digital Recording" and in "Magnetic Recording Handbook. Technology and Applications" by C. Denis Mee and Eric D. Daniel.

Because of the relatively small magnetic medium data density a high margin of recording tolerance is possible and should permit some degree of variation in the distance between the magnetic reader/writer 220 and the magnetic medium. However, if needed, a pressure clip, protruding spring-loaded reader/writer, magnetoresistive material, or alternative means could be included to ensure that adequate contact between the magnetic reader/writer 220 and the magnetic medium is maintained irrespective of card dimensions.

In operation, the digital card information to be encoded onto the magnetic medium is formatted by the wallet micromodule 200 into magnetic medium position order, then stored. As the card is moved the magnetic medium position, defined by the MPC 310, is read by the MPT 320 and reported to the wallet micromodule 200. The wallet micromodule 200 then instructs the MWT 330 to encode the digital card information that corresponds to that reported position. The MRT 340 then reads the encoded information and passes it back to the wallet micromodule 200 so that it can determine if encoding has been performed correctly.

While the MPC 310 positions are fixed, the ratio of MPC 310 positions to a digital card information bit is dynamic. This allows information to be stored at different densities on different magnetic tracks. This ratio is used by the wallet micromodule 200 to determine if any instruction needs to be conveyed to an MWT 330, e.g. if the ratio is 5:1, one digital card information bit will be spread over the same area taken up by 5 MPC 310 positions, and the wallet micromodule 200 will only need to instruct the MWT 330 for every 5th MPC 310 position.

Figure 3B:
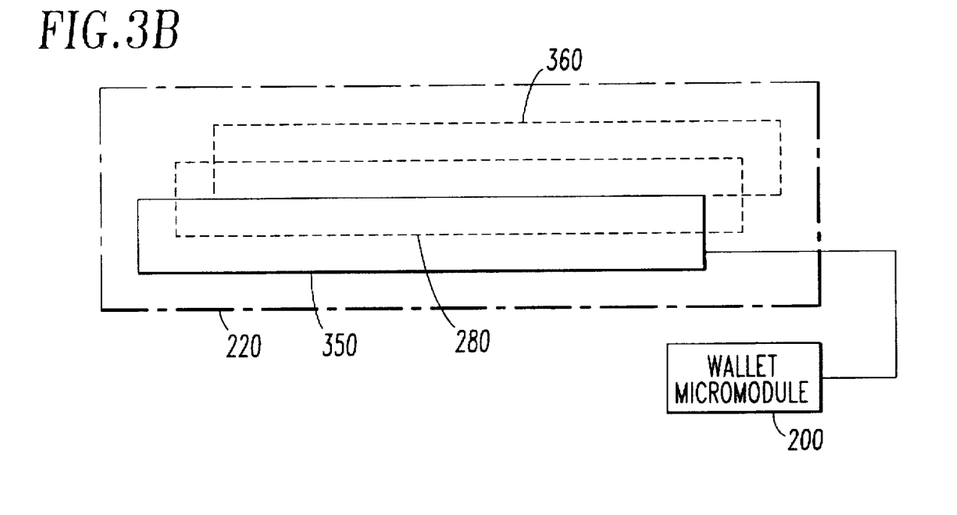
FIG. 3B illustrates a block diagram of the present invention showing the components used to perform stationary encoding of a magnetic stripe located on a separate card or programming of a magnetic stripe located on an electronic wallet-card.

FIG. 3B illustrates a block diagram of the components of the present invention used to perform stationary encoding of a magnetic stripe 280 located on a separate card, or programming of a magnetic stripe 280 also located on an electronic wallet-card 400.

As seen in FIG. 3B, another embodiment of a magnetic reader/writer 220 is shown, with this embodiment achieving magnetic medium reading and writing while both the electronic wallet 100 and the card are stationary. The only difference between this embodiment and the preferred embodiment is in the reader/writer method which uses a magnetic transducer array 350 (MTA). The card is inserted into the electronic wallet 100 with the card magnetic stripe 280 placed against the MTA 350. A magnetic material, such as a ferrite slurry, is placed on the side of the electronic wallet 100 immediately opposite the MTA 350 and acts as a magnetic flux closer 360. The magnetic flux closer 360 and MTA 350 effectively surround the magnetic stripe 280 and achieve flux closure with it.

The MTA 350 consists of a number of magnetic transducers with data being fed by the wallet micromodule 200 to the appropriate transducer which then encodes or reads an adjacent portion of the magnetic stripe. A variety of methods could be adopted to achieve reading/encoding. These include positioning the data bits by multiplexing or providing a separate path for each data bit to each transducer. However, the preferred embodiment will use a magnetic shift register memory (MSR) approach.

A wide variety of MSRs have been designed as shown by U.S. Pat. Nos. 3,947,139 to Tickle, 4,124,901 to Battarel, 3,786,449 to Jauvitis, 3,774,182 to Copeland III and 4,199,819 to Scwhee et al., all of which are incorporated herein by reference. A variety of techniques are possible including but not limited to: domain wall motion, magnetic bubbles and domain tip propagation. One major advantage of the magnetic shift register is the avoidance of data positioning logic circuitry. Once magnetized, magnetic bits are propagated serially along the magnetic shift register in the sequence they are submitted to that register. The magnetic stripe 280 serves as the register magnetic medium, with an MWT 330, propagation circuitry and MRT 340 located on the electronic wallet 100.

Another method of stationary encoding would be to position data bits in the correct sequence and have each position's value used by one or more MWTs 330 to encode the adjacent magnetic medium area. Effectively this method requires two steps, data positioning and magnetic bit encoding. For data positioning an X/Y matrix approach could be adopted with this approach permitting the use of cross fields or co-incident current fields as a method of encoding. An example of co-incident current is demonstrated in U.S. Pat. No. 5,063,467 to Colineau et al., while an example of cross field encoding is demonstrated in U.S. Pat. No. 4,751,598 to Hamilton, both of which are incorporated herein by reference. However, the most suitable option would appear to be the use of a data shift register for data positioning, with one or more MWTs 330 and MRTs 340 connected to each register position. Encoding could be performed during or after shift register input, with many other variations of encoding using a data shift register possible and obvious to those skilled in the art.

Any method of encoding could be complemented by inclusion of a single value encoder. This encoder would reset all magnetic medium values to a single polarity which would require the varying data encoder to set only the applicable reverse polarity values. A multi-turn electromagnetic coil would be one method of achieving this task.

Figure 4A:
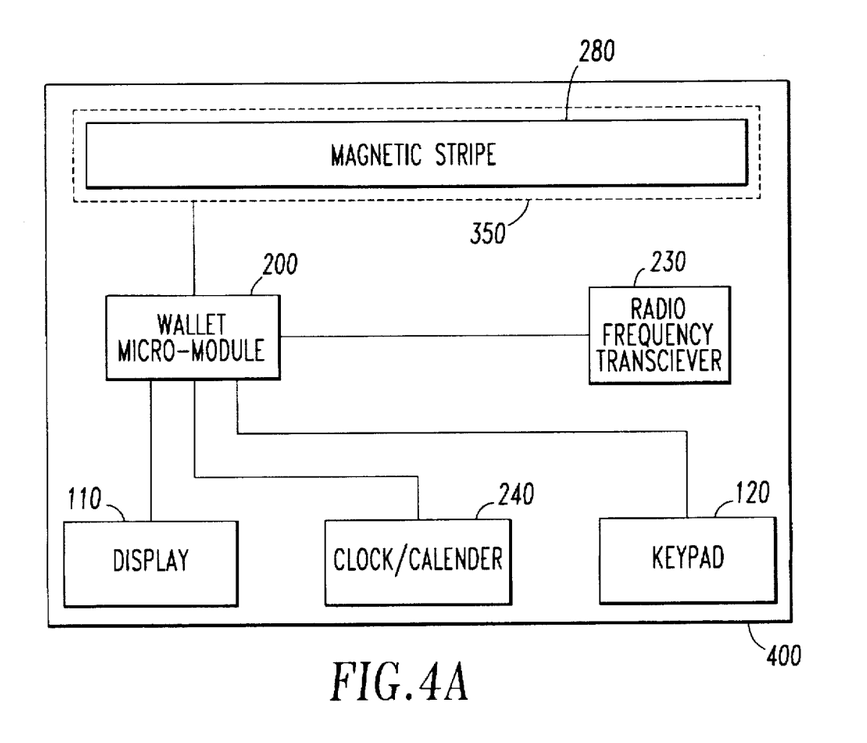
FIG. 4A depicts a block diagram of electronic wallet-card components in accordance with the present invention.
Figure 4B:
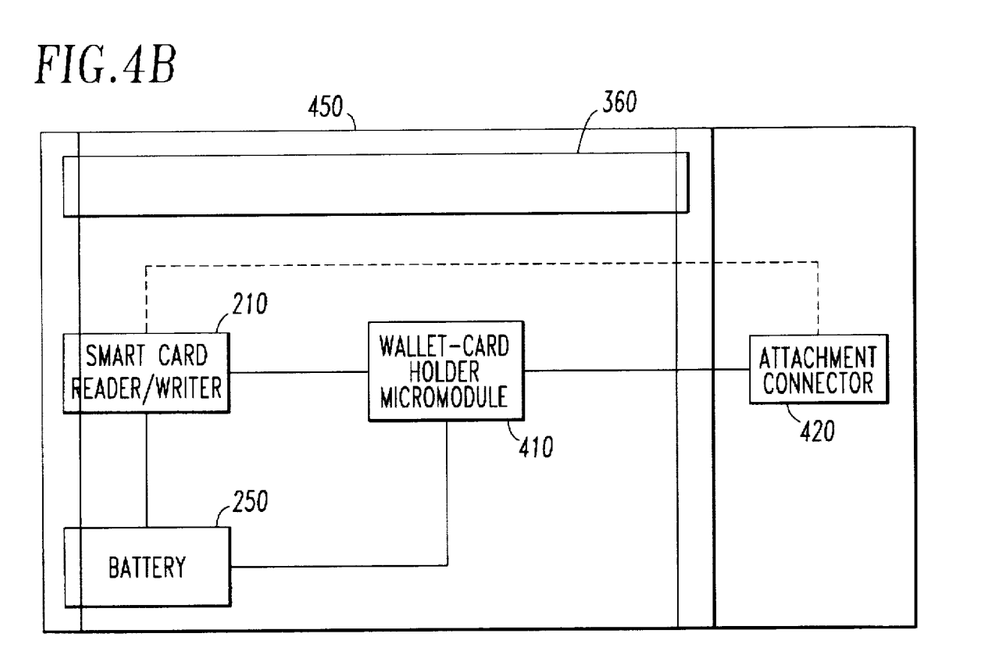
FIG. 4B depicts a block diagram of electronic wallet-card holder components in accordance with the present invention.

A alternative embodiment of the electronic wallet 100 is disclosed in FIGS. 4A and 4B. In this embodiment, the electronic wallet 100 and generic multimedia card 260 are combined to create an electronic wallet-card 400 of dimensions that comply with ISO document 7810. No card slot 130 or smart card reader/writer 210 are included. However, a wallet-card holder 450 is provided to add certain functions to the wallet-card 400.

FIG. 4A illustrates a block diagram of the components for the wallet-card 400. A keypad 120, display 110, radio frequency transceiver 230 and clock/calendar 240 perform the same functions as outlined in FIG. 2A for an electronic wallet 100. Reading and writing of the magnetic stripe 280 is performed as shown in FIG. 3B and described in the accompanying description thereto, with the following differences. The magnetic flux closer 360 is now located on the wallet-card holder 450 and the magnetic transducer array 350 has been relabelled as a magnetic programmer 350. A magnetic programmer 350 is defined as a magnetic transducer array 350 capable of reading from or writing to a single magnetic stripe 380, with ability to read or write to any magnetic medium precluded.

FIG. 4B provides a block diagram of the wallet-card holder 450 components. The wallet-card holder 450 is used to hold a wallet-card 400 and provides rigidity to the wallet-card 400 to prevent excessive flexing. The wallet-card holder 450 also includes a battery 250 power supply, which could be augmented by or replaced with solar cells, and a wallet-holder micromodule 410. The wallet-holder micromodule 410 is included to provide separate levels of security and to perform wallet-card 400 authentication, but could equally be omitted if neither is needed.

A smart card reader/writer 210 is also provided, to enable power to be supplied to the wallet-card 400 and to allow data exchange between the wallet-holder micromodule 410, or a media attachment 550, and the wallet-card 400.

Figure 4C:
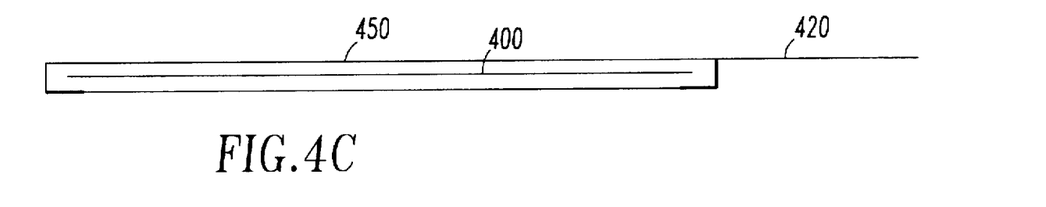
FIG. 4C illustrates an elevated view of an electronic wallet-card holder in accordance with the present invention and a wallet-card placed within this holder.

The wallet-card holder 450 also functions as a generic attachment card 500, with an attachment connector 420 provided. The attachment connector 420 is of the pull-out, fold-over or similar variety—to reduce overall carrying dimensions, and allows the addition of any media attachment 550. FIG. 4C illustrates an elevated view of the electronic wallet-card holder 450 with a wallet-card 400 located within it.

Figure 5A:
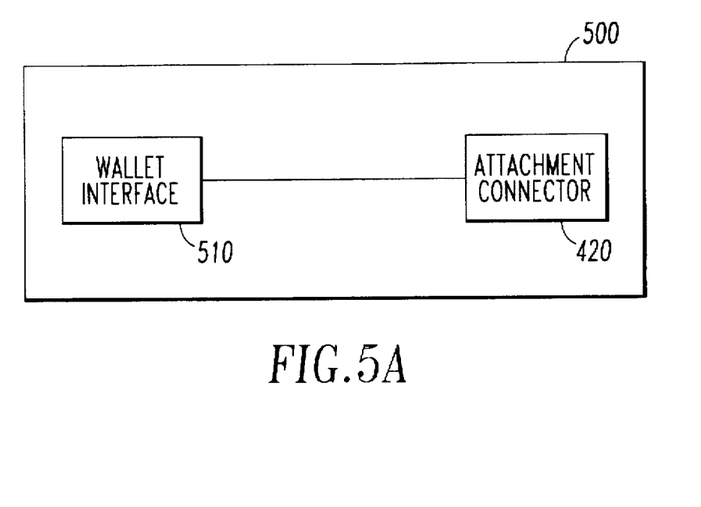
FIG. 5A is a schematic view of a generic attachment card used with the present invention.

FIG. 5A is a schematic view of a generic attachment card 500. This card is used to provide ability to fit one of any number of media attachments 550 to an electronic wallet 100. It is inserted into the card slot 130 thereby creating an data input-output connection and eliminating the need to include a wallet input-output port.

The height and width of the generic attachment card 500 is the same as a generic multimedia card 260, with the length sufficiently long to allow a media attachment 550 to correctly attach to the attachment connector 420 when the generic attachment card 500 is completely inserted into the electronic wallet 100 card slot 130. To reduce card size, the generic attachment card 500 could be made expandable by comprising overlapping or fold over segments, and only made up to its full size when it is to be used.

A further serial input-output port (not shown) could also be provided on the electronic wallet 100. This would be combined with one or more switches to provide electronic wallet 100 to smart card reader/writer 210, electronic wallet 100 to input-output port, and smart card reader/writer 210 to input-output port connections.

Figure 5B:
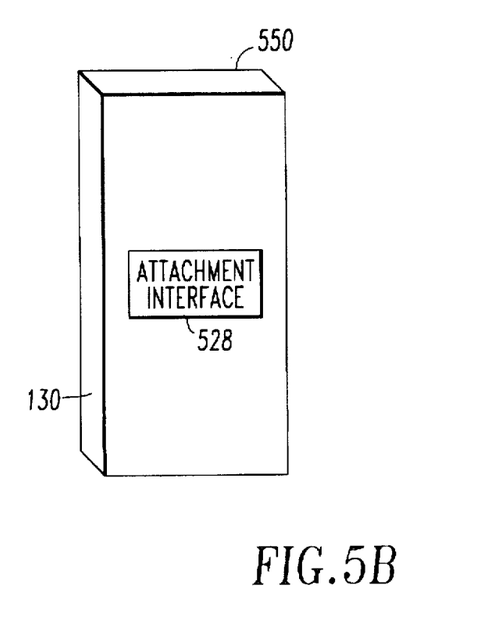
FIG. 5B is an perspective view of a medium attachment.

FIG. 5B illustrates an example of a media attachment 550. A card slot 130 allows a generic attachment card 500, generic multimedia card 260 or smart card to be connected to a media attachment 550, with data and/or power exchange occurring via an attachment interface 520. A variety of small sized, highly functional attachments can be used as required.

All attachments are designed with a standard media attachment 550, which includes at least an attachment interface 520 and a card slot 130 of approximately the same dimensions as the card slot 130 in the electronic wallet 100 of FIG. 1. Typically the smart card reader/writer 210, wallet interface 510, attachment connector 420 and attachment interface 520 complies with smart card connection and placement standards as outlined in ISO documents 7816 and 10536. This allows any attachment connector 420 or smart card to be inserted into a media attachment 550 with an electronic connection correctly established.

Alternatively, a different attachment interface (not shown) could be developed to interface with the additional serial input-output port (not shown). All potential attachments could then be designed to interface with an electronic wallet 100 via this port.

Some potential attachments include a pass through attachment to allow digital cards and transactions to be transferred between an electronic wallet 100 and a memory module located on either the media attachment 550 or a separate smart card. Also a generic cable capability to insert a cable with a serial or parallel connector on one end and an attachment connector 420 on the other end could be provided.

A second attachment that could be used includes a telephone attachment with a fax/modem and/or Dual Tone Multi-Frequency (DTMF) transceiver, and a phone cable connector.

A third example includes an infrared attachment with an infrared transceiver, to provide interaction with existing and future television/multimedia control units.

A fourth and final example includes a radio frequency attachment with radio frequency transceiver 230 to allow a smart card to communicate via radio frequency waves. Some potential uses include an electronic purse attachment to make payments, a radio frequency key for cars, homes etc, an extended radio frequency range transceiver to make road toll payments, and a long range transceiver to provide paging and personal communications services.

Having defined the various components, the method of operation of the present invention can easily be understood. A desired task or operation to be performed is selected, with the most common being "PAY." A digital card is then selected, such as CR (credit), and optionally a DATA item is also selected, depending on the operation chosen.

Should multiple digital cards exist, the user is presented with a list of available cards and requested to select one. Digital card selection can be initiated by either the wallet user or by an interactive medium.

Once selected, the digital card is processed by the wallet micromodule 200 according to the digital card process instructions. A default output media is optionally defined for a digital card, with the overall default being the magnetic medium. However, interactive media can override these defaults and specify a different media interface.

A digital card transaction is formatted according to parameters stored within the chosen digital card process, with these parameters optionally tailored according to the medium to be used. Data for a digital card transaction can be obtained from the digital card itself, from the user via the keypad 120, from a card located within the electronic wallet 100, and/or from the medium that is interacting with the electronic wallet 100. The formatted transaction is then output to the selected medium interface.

Card transaction formatting can include encryption of all or any parts of the transaction, and may also include one or more hash codes. A hash code, also referred to as a message digest code, is a code generated by a mathematical algorithm. Specific information is fed into this algorithm and a code representing this information is created. This process can then be repeated at a later time to ensure that information has not been altered, as any change will result in a different hash code being generated. Both encryption and hashing code generation will typically be performed by either the wallet micromodule 200 and/or the card micromodule 270.

Any follow up actions are taken according to digital card process instructions after digital card transaction output has been completed. These includes such steps as automatic transaction recording, transaction identifier updating, etc.

The ability to define when a user password is required is the preserve of the digital card issuer. However, within any limits set by this issuer, the user has the ability to define digital card and wallet password protection according to individual needs.

A major benefit of the electronic wallet 100 is the ability to use any insecure communications medium such as a phone or fax. Electronic cash, checks, card renewals etc. are requested by having the electronic wallet 100 generate and store a secure request code. This code is then submitted to a request approver using telephone communication means such as speech or phone keys, with an approval code being issued by the approver and entered into the electronic wallet 100 via the keypad 120. Approval authentication and request comparison are then performed before updating and request removal. Of course more efficient ways of achieving these tasks is possible, but would be require extra equipment and electronic circuitry.

A further wallet benefit is the ability to secure a digital card transaction and output it to any media acceptor. An example of this is the ability to use any magnetic reader and existing infrastructure to accept electronic cash or checks, on-line debit or secured credit transactions, and have them all use the same communications network or offline authentication methods to prove transaction authenticity.

Cash and checks could be encrypted, authenticated by the acceptor, communications provider or digital card issuer, and settled via electronic funds transfer. On-line debit transactions could be structured to mimic the existing debit transactions, with the amount and pin input by the user via the wallet keypad 120 and encrypted by the wallet micromodule 200. Finally, credit transactions could take advantage of the inclusion of passive hash codes (such as CVVs) and the creation of unique payee identifiers to make the hash code dynamic. By entering a payee number and, optionally, an amount, and by incorporating these items and a secret code into this hash code, a credit transaction can be made dynamic, unique, and payee specific without having to change any part of the infrastructure. Furthermore, entry of this information allows these transactions to be automatically recorded by the wallet.

Off-line authentication can be achieved by encrypting digital card transactions using asymmetrical encryption, and/or by symmetrical encryption combined with a secure payment authentication device (pad). Decryption can then be performed and authentication established by the card recipient without endangering the security of the encryption process. Random, medium specific or periodic on-line authentication, as an extra security measure, can then be performed according to wallet and recipient parameters.

The ability to generate a secure transaction and to delivery that transaction using any insecure communications method has enormous potential in the area of payments. The electronic wallet 200 and generic multimedia card 260 can now function as a universal payment generator in that ANY and all payments could now be made using these items, and a completely new and revolutionary Payment method can now be provided.

By securing a payment, separation of payment generation from payment delivery is achieved. When combined with the ability to submit a payment via any media interface, any payment delivery vehicle can then be used (e.g. payment displayed and communicated verbally, by touch-tones, or in writing using a fax, over any phoneline; payments transferred electronically or manually to a PC, PDA or any other electronic device such as an ATM or Kiosk; payments conveyed in writing using traditional postal delivery).

While a payment will be secured by encryption, it can be made even more secure by the creation of a new payment format which does not specifically include any payment account information. This format (called a PAT for Public Account Transaction) is based on use of identifiers and includes a unique payer identifier, a secure PAT code, the payment amount, and optionally a payee identifier—although bearer based payments could be created with optional inclusion of a PIN for payee protection. The payee identifier could also be included in the PAT code to provide total payment confidentiality—all that would be revealed is the payer identifier and payment amount.

The PAT code will include a digital card identifier which is unique to that payer, and will allow any payment facility to be used (Debit, Credit or Cash). A payment sequence number unique to that payer will also be included to stop payment re-use. Finally, a payment hash code will be included to ensure the correctness of all payment information, and to make each payment more secure. This hash code could include such information as: the payer identifier, the amount and currency, the actual payment instrument account number and expiry date, the payment sequence number, and the payee identifier—if present.

PAT payments would then provide the best of both worlds, The offer the flexibility and portability of a credit card number, but with much more security than a check so that they can be safely seen and handled by any party. This allows them to be delivered electronically to a local entity using free or cheap communications (e.g. a telephone call), then batch delivered to a central hub for processing using economies of scale.

A central hub would authenticate each payment, check for payment duplication, then reformat that payment depending on the type of payment instrument used. Payment settlement would then be preformed using existing secure networks (e.g. Credit, ATM, ACH etc).

By separating the payer identifier and amount from the encrypted PAT code, Payments can be made much more secure in two ways. Firstly, PAT codes can be encrypted using a key unique to that payer, so that payment decoding would only provide access to a single payer and payer instrument, and then only via a PAT payment format as no instrument information has been revealed. Secondly, security can be increased in proportion to the amount being paid. Payment authentication will then vary depending on this payment amount.

Various other operations provide further benefits. Digital card usage automatically requires a digital card to be active, with expiration of a digital card resulting in an inability to use it. Similarly, digital card access can be made password and/or amount specific. Many other payment and non-payment related benefits are also possible.

As can be seen, the concept of a multimedia electronic wallet 100 and generic multimedia card 260 that provides media interfaces in the form of a smart card reader/writer 210 magnetic reader/writer 220, radio frequency transceiver 230 and user interface, as well as providing generic media interface expendability, has not been developed to date. This wallet provides advantages such as: ease of use, universal acceptability, new financial instruments, offline payment authentication, and reduction of fraud. Specifically, an electronic wallet 100 and generic multimedia card 260 that allows the existing magnetic stripe 280 infrastructure to be retained, permits the inclusion of smart card digital cards, provides very fast and convenient radio frequency communications, and allows any existing or new digital card to be submitted via any of these or other media interfaces, has not been envisioned prior to the electronic wallet of the subject invention.

The electronic wallet 100 and generic multimedia card 260 of the subject invention provides convenience, security and simplicity for the wallet owner, digital card issuer and digital card acceptor, and in a very cost-effective manner. The electronic wallet 100 and generic multimedia card 260 solve all the aforementioned and other traditional wallet item problems and supersede this wallet as the primary wallet of choice.

While the subject invention has been described with reference to the preferred embodiments, it should be understood that various changes and modifications could be made therein, by one skilled in the art, without varying from the scope and spirit of the subject invention as defined by the appended claims.

What is claimed is:

1. A compact electronic wallet comprising:
   user interface means for receiving input including medium selection and transaction initiation commands from a user of the electronic wallet;
   processor means connected with said user interface means for controlling the operation of the electronic wallet in response to said user input;
   smart card interface means connected with said processor means for transferring data between the electronic wallet and processing circuitry on a multimedia transaction card; and
   magnetic medium interface means connected with said processor means for writing data to a magnetic medium on the multimedia transaction card.

2. The electronic wallet of claim 1 wherein said processor means includes a micromodule.

3. The electronic wallet of claim 1 wherein said processing circuitry includes a micromodule.

4. The electronic wallet of claim 1 wherein said magnetic medium interface means further operates to read data from said magnetic medium on said multimedia transaction card and to transfer said data to the electronic wallet.

5. The electronic wallet of claim 4 further including radio frequency transceiving means for transferring data between the electronic wallet and a remote data processing device.

6. The electronic wallet of claim 1 further including radio frequency transceiving means for transferring data between the electronic wallet and a remote data processing device.

7. The electronic wallet of claim 1 wherein said digital card information is formatted to correspond to predetermined physical positions within the magnetic medium and said magnetic medium interface means comprises:
   magnetic medium position detecting means for detecting the position of the magnetic medium contained on the multimedia transaction card and for generating position information corresponding to said detected position; and
   magnetic medium writing means for receiving said data to be written to the magnetic medium and for writing said data to the magnetic medium carried on the multimedia transaction card;
   wherein said processor means further operates to read said position information from said magnetic medium position detecting means and to transfer said data corresponding to said position information to said magnetic medium writing means.

8. The electronic wallet of claim 7 wherein the magnetic medium carried on the multimedia transaction card comprises a first portion for storing magnetic medium positioning information and a second portion for storing said data information.

9. The electronic wallet of claim 8 wherein said first portion of the magnetic medium contains a magnetic positioning clock and said magnetic medium position detecting means includes a thin film magnetoresistive head that detects said magnetic positioning clock.

10. An electronic wallet including a magnetic medium interface for transferring card data between the electronic wallet and a magnetic medium contained on a transaction card comprising:
    storage means for storing the card data to be written to the transaction card, said card data being formatted to correspond to predetermined physical positions within the magnetic medium;
    magnetic medium position detecting means for detecting the position of the magnetic medium contained on the transaction card and for generating position information corresponding to said detected position;
    magnetic medium writing means for receiving said card data from said storage means and for writing said card data to the magnetic medium carried on the transaction card; and
    processor means connected with said storage means, said magnetic medium position detecting means and said magnetic medium writing means for receiving said position information from said magnetic medium position detecting means and for transferring said card data corresponding to said position information from said storage means to said magnetic medium writing means.

11. The electronic wallet of claim 10 wherein said processor means includes a micromodule.

12. The electronic wallet of claim 10 wherein the magnetic medium carried on the transaction card comprises a first portion for storing magnetic medium positioning information and a second portion for storing said card data information.

13. The electronic wallet of claim 12 wherein said first portion of the magnetic medium contains a magnetic positioning clock and said magnetic medium position detecting means includes a thin film magnetoresistive head that detects said magnetic positioning clock.

14. The electronic wallet of claim 10 wherein said magnetic medium interface further comprises magnetic medium reading means for reading said card data from the magnetic medium carried on the transaction card and for providing said card data to said processing means.

15. The electronic wallet of claim 10 wherein said transaction card is a multimedia transaction card and said electronic wallet further comprises smart card interface means connected with said storage means and said processor means for transferring data between processing circuitry contained on the multimedia transaction card and said storage means.

16. The electronic wallet of claim 15 wherein said processing circuitry includes a micromodule.

17. A method of transferring card data between an electronic wallet and a magnetic medium contained on a transaction card comprising the steps of:

receiving said transaction card into a magnetic medium interface contained in the electronic wallet;

formatting said card data to correspond to predetermined physical positions within said magnetic medium contained on said transaction card;

detecting the position within said magnetic medium interface of the magnetic medium contained on said transaction card; and  writing said card data corresponding to said detected position to said magnetic medium.

18. The method of claim 17 wherein said step of detecting the position of the magnetic medium contained on said transaction card includes the step of detecting a magnetic positioning clock provided on said magnetic medium contained on said transaction card.

19. The method of claim 18 further comprising the step of reading said card data from said magnetic medium.

20. The method of claim 19 further comprising the step of comparing said card data read from said magnetic medium with said card data written to said magnetic medium to verify the integrity of said card data written to said magnetic medium.

21. The method of claim 17 wherein said transaction card is a multimedia transaction card.

22. A method of initiating a secure electronic transaction through the use of a magnetic medium interface and an electronic wallet for receiving a compatible multimedia transaction card having a magnetic medium thereon, comprising the steps of:

receiving input to the electronic wallet, said input including digital card selection information and transaction format selection commands from a user of the electronic wallet;

retrieving a digital card data set containing digital card data corresponding to said input from an electronic memory containing a plurality of digital card data sets;

formatting said digital card data, including encrypting at least part of the digital card data, to correspond to a transaction format selected by said transaction format selection commands;

writing said formatted digital card data to the magnetic medium on the multimedia transaction card; and  initiating an electronic transaction by providing said multimedia transaction card to a magnetic medium interface, reading said formatted digital card data from said magnetic medium on said multimedia card and initiating a transaction using said digital card data.

23. The method of claim 22 including the step of verifying the identity of the multimedia transaction card to confirm that said transaction card is authorized to receive said digital card data.

24. The method of claim 23 wherein said step of verifying the identity of the multimedia transaction card includes accessing digital data stored in an integrated circuit chip on said multimedia transaction card.

25. The method of claim 23 wherein said step of verifying the identity of the multimedia transaction card is performed immediately prior to said step of writing said formatted digital card data to the magnetic medium on the multimedia transaction card in order to prevent card substitution.

26. The method of claim 22 wherein said step of encrypting at least part of the digital card data is performed by a micromodule on the multimedia transaction card.

27. The method of claim 22 wherein said step of encrypting at least part of the digital card data is performed by a micromodule in the electronic wallet.

\* \* \* \* \*